United States Patent
Cox et al.

(10) Patent No.: US 8,339,366 B2
(45) Date of Patent: Dec. 25, 2012

(54) GAME CONSOLE CONTROL TO INITIATE SYSTEM DIRECTIVES

(75) Inventors: Jason Alan Cox, Raleigh, NC (US); Lydia Mai Do, Research Park Triangle, NC (US); Jana Helton Jenkins, Raleigh, NC (US); William Gabriel Pagan, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 937 days.

(21) Appl. No.: 12/118,449

(22) Filed: May 9, 2008

(65) Prior Publication Data

US 2009/0280899 A1 Nov. 12, 2009

(51) Int. Cl.
*G09G 5/00* (2006.01)
(52) U.S. Cl. .......................................... 345/169; 463/31
(58) Field of Classification Search .............. 463/25–42; 340/3.1; 348/14.08; 715/810
See application file for complete search history.

(56) References Cited

U.S. PATENT DOCUMENTS

| | | | |
|---|---|---|---|
| 5,900,867 A * | 5/1999 | Schindler et al. ............. 715/719 |
| 6,204,852 B1 * | 3/2001 | Kumar et al. ................. 345/419 |
| 7,230,538 B2 * | 6/2007 | Lai et al. ..................... 340/573.1 |
| 7,340,077 B2 * | 3/2008 | Gokturk et al. ............... 382/103 |
| 7,519,658 B1 * | 4/2009 | Anglin et al. ................. 709/203 |
| 7,596,466 B2 * | 9/2009 | Ohta ............................. 702/152 |
| 7,627,139 B2 * | 12/2009 | Marks et al. .................. 382/103 |
| 7,702,608 B1 * | 4/2010 | Bererton et al. ................ 706/46 |
| 7,716,008 B2 * | 5/2010 | Ohta ............................. 702/152 |
| 7,804,484 B2 * | 9/2010 | Martinez et al. .............. 345/156 |
| 7,850,527 B2 * | 12/2010 | Barney et al. ................... 463/37 |
| 7,957,554 B1 * | 6/2011 | Silver et al. ................... 382/103 |
| 2003/0227473 A1 | 12/2003 | Shih et al. |
| 2004/0222970 A1 * | 11/2004 | Martinez et al. .............. 345/169 |
| 2006/0111188 A1 | 5/2006 | Winkler |

FOREIGN PATENT DOCUMENTS

KR 20040060376 7/2004

* cited by examiner

*Primary Examiner* — Masud Ahmed
(74) *Attorney, Agent, or Firm* — Yee & Associates, P.C.; Catherine Ivers

(57) ABSTRACT

A method and system for utilizing a game console and an input device is disclosed. The method and system comprise mapping commands to system directives of the game console and generating an input signal having predefined characteristics corresponding to the input device being utilized to engage the system directives. The method and system include performing system functions using an input controller associated with the input device after the system directives are engaged.

18 Claims, 3 Drawing Sheets

GAME CONSOLE CONTROL TO INITIATE SYSTEM DIRECTIVES

FIELD OF THE INVENTION

The present invention relates generally to game consoles and specifically to providing system directives to game consoles.

BACKGROUND OF THE INVENTION

Current home game consoles are becoming enabled with increasingly functional operating systems. In the past, using the embedded functions in gaming consoles has been cumbersome, due to navigational limitations presented by using a game controller for all tasks. Navigational enablements are needed for performing these new game console dashboard functions to enhance the console user experience. The present invention addresses such a need.

SUMMARY OF THE INVENTION

A method and system for utilizing a game console and an input device is disclosed. The method and system comprise mapping commands to system directives of the game console and generating an input signal having predefined characteristics corresponding to the input device being utilized to engage the system directives. The method and system include performing system functions using an input controller associated with the input device after the system directives are engaged.

DETAILED DESCRIPTION OF PREFERRED EMBODIMENTS

Figure 1:
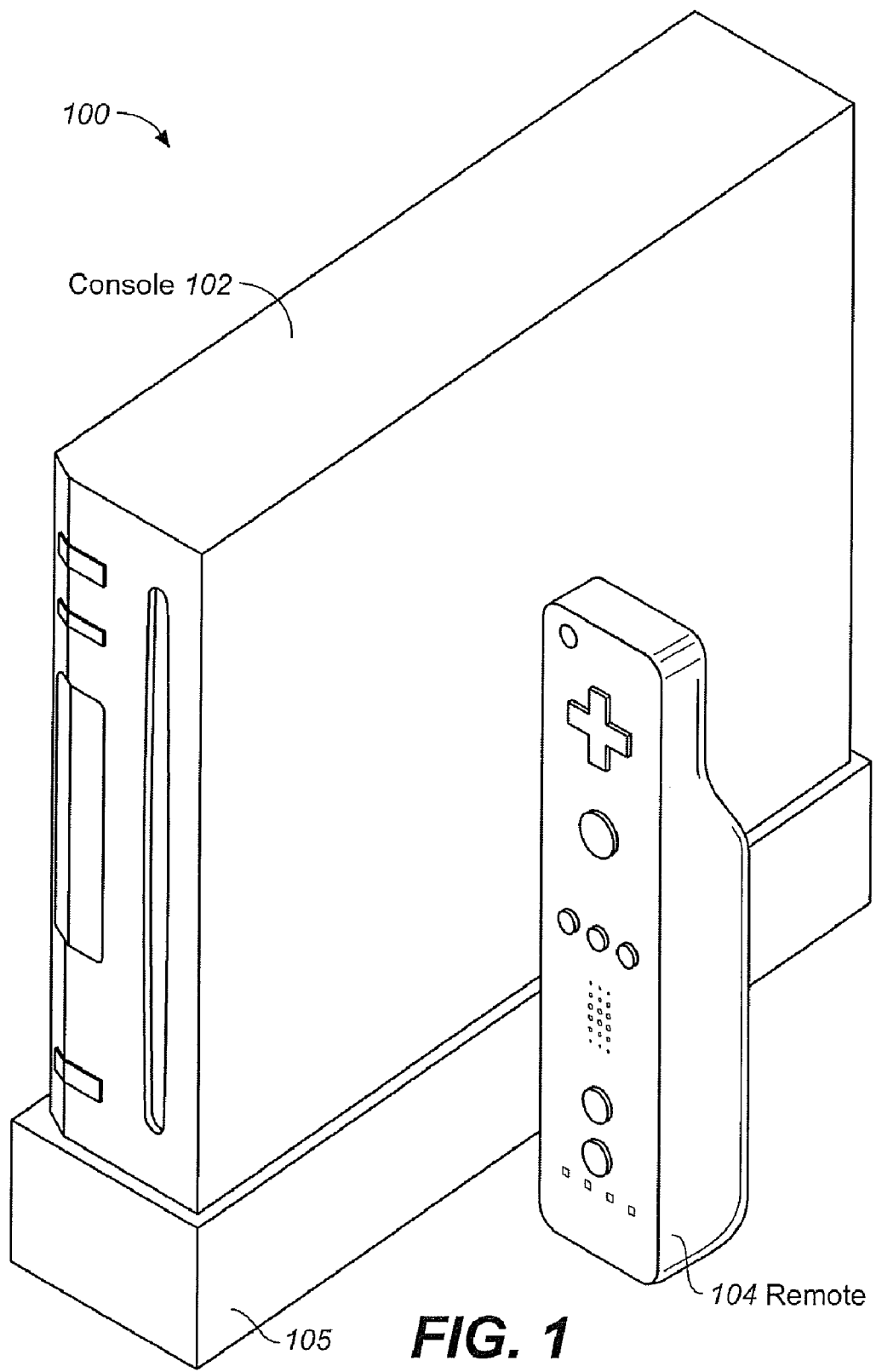
FIG. 1 is an illustration of a Nintendo® game console and a remote, hereinafter referred to as the Wii® system.

The present invention relates generally to game consoles and specifically to providing additional system directives to game consoles. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Recent enhancements to various input methodologies are utilized in accordance with the present invention to create new ways of issuing directives to game consoles. For example, text input devices now allow a text-based console directive system, which uses DOS or IRC-like commands, to quickly and easily perform various system functions. Other input devices, such as eye-tracking systems, allow for motion-based directives to perform system functions. Still other input devices, such as those utilizing motion-sensing input devices, now also allow for gesture-based directives to perform system functions. It is envisioned by the present invention that a diversity of input devices are included as a part of the present invention, independent of their system functions, where each input device is capable of performing one or more system functions in relation to the specific input device As used herein, the term "input device" includes any input device capable of performing one or more system functions in relation to the input device. An "input device" as used herein includes at least a parsing and execution engine, and may include any one or more of the input devices above, gaming controllers, and, without limitation, singly or in combination, any of the following types of input devices: touch-sensitive; motion-sensitive; multi-degrees-of-freedom (MDOF); inertia-sensing; depression-activated; force-input; mass-based providing kinesthetic feedback; mass-reduced providing virtual feedback; gesture-based; neural-impulse-based; muscular-activity-based; pointing-based; stylus-derived; voice-activated; light-activated; and the like.

A system that utilizes an issuing directive process in accordance with the present invention can take the form of an implementation of entirely hardware, entirely software, or may be an implementation containing both hardware-based and software-based elements. In one implementation, this disclosure is implemented in software, which includes, but is not limited to, application software, firmware, resident software, program application code, microcode, etc.

Furthermore, the issuing directive process of the present invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device. Further a computer-readable medium includes the program instructions for performing the steps of the present invention. In one implementation, a computer-readable medium preferably carries a data processing or computer program product used in a processing apparatus which causes a computer to execute in accordance with the present invention. A software driver comprising instructions for execution of the present invention by one or more processing devices and stored on a computer-readable medium is also envisioned.

The medium can be an electronic, magnetic, optical, electromagnetic, infrared, or semiconductor system (or apparatus or device) or a propagation medium, or a signal tangibly embodied in a propagation medium at least temporarily stored in memory. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include DVD, compact disk-read-only memory (CD-ROM), and compact disk-read/write (CD-R/W).

FIG. 1 is an illustration of a Nintendo® game console 102 having a base 105, and a remote 104, hereinafter referred to as the Wii® system 100. A distinguishing feature of the console 102 is its associated wireless controller (i.e., remote) 104, also known as the Wii® remote, which can be used as a handheld pointing device and can detect acceleration in three dimensions (i.e., motion-sensing technology).

Although the present invention is described in the context of a Wii system 100 which includes a wireless controller 104 with motion sensing technology, one of ordinary skill in the art readily recognizes that a variety of systems which include motion sensing technology and other input devices could be used without limitation and that the use of such systems is envisioned herein and would be within the spirit and scope of the present invention.

The Wii system 100 includes the console 102, a stand 105 to allow the console 102 to be placed vertically oriented in one scenario, at least one Wii remote 104, and a sensor bar (not shown) for sensing the position of the remote 104 by exchanging information signals with the remote. For a complete description of the elements of a Wii system 100, refer for example to the Wii operation manual system set-up at www.nintendo.com.

The Wii remote 104 is the primary controller for the console 102. The remote 104 uses a combination of built-in accelerometers and infrared detection to sense its position in 3D space when pointed at the LEDs within a sensor bar. This design allows users to control the game using physical movements and gestures (hereinafter collectively referred to as "gestures") as well as traditional input depression techniques such as button presses.

The Wii wireless remote 104 connects to the console 102 using Bluetooth® and the remote also features an internal speaker. The Wii remote 104 can connect to other devices through, for example, a proprietary port at the base of the remote 104.

A system and method in accordance with the present invention allow for system functions to be performed on a gaming console. To describe the features of the invention in more detail, refer now to the following description in conjunction with the following description. In one aspect, an input device of the present invention may be utilized to provide system directives to the game controller in various implementations. As defined earlier, there are envisioned a diversity of types of input devices that can be utilized for the present invention.

Figure 2:
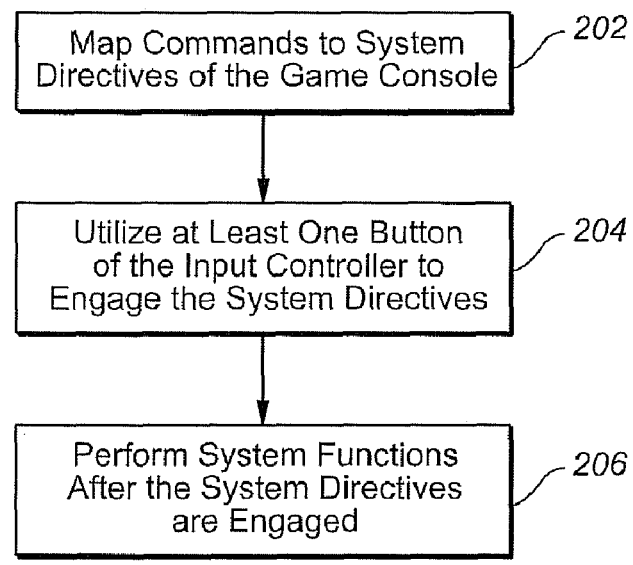
FIG. 2 is a flow chart for providing system directives using a game console in accordance with the present invention.

FIG. 2 is a flow chart for providing system directives using a game console in accordance with the present invention. The process includes mapping commands to system directives of the game console, via step 202. Next, at least one button of an input controller is utilized to engage the system directives, via step 204. Finally, the input controller is utilized to perform systems functions after the system directives are engaged, via step 206.

A key aspect of the present invention includes the use of text-based as well as gesture-based directives to perform those system functions in accordance with select implementations. Accordingly, an input controller could be utilized to provide system directives to the game controller. These system directives are then utilized to perform different tasks such as chatting, booting system functions and controller options and managing peripheral and other external devices.

In a further implementation, the input controller could part of the gaming system such as the Wii remote 104 to provide gesture based directives or the input controller could be a text input device to provide text based directives. Providing gesture-based directives and text-based directives are described in more detail hereinbelow.

Gesture-Based and Other Non-Text Directives

In one implementation, a controller such as the Wii remote 104 (FIG. 1) that includes motion sensing technology to provide gesture-based direction can be utilized to provide gesture-based directives. This has the advantage of using the existing controller for providing the system directives rather than requiring any additional device to provide the system directives. In another implementation, the user could initiate a reserved sequence of controls on the remote 104 (e.g. keys=press pause and/or gestures=swing-swing-down) to enter a state that is reserved for issuing system directives. Once this reserved state has been accessed, gestures can be used to initiate the system functions.

In addition, preferably, the remote could be utilized with an optical system to provide gesture-based directions. For example, the remote could include an XBOX Vision Camera to allow the gestures to be recognized visually. In so doing, the gestures can be visually determined and that information can be utilized to provide the gesture based directives via the remote as described above, in relation to one or more predetermined characteristics of the input device, for example.

Further, a neural impulse actuator based system could be utilized to provide muscle-based direction, whereby one or more sensors are placed on a user to interpret signals received from brain, eye and facial muscle activity, for instance. A neural impulse actuator based system could be further utilized to provide gesture-based direction in certain implementations. The system could be further utilized with a controller that includes muscle-based detection technology. In the preferred embodiment, the user could initiate a reserved sequence of controls to enter one or more states that are reserved for issuing system directives in relation to one or more muscle-based movements or gesture-based movements. Once this reserved state has been accessed, muscle or gesture-based movements can be used to initiate any of the system functions mentioned above in the text-based directive or other descriptions, in relation to one or more predetermined characteristics of the input device, for example.

Additionally, a system utilizing a personal computer and camera situated to detect eye gaze while compensating for measurement errors caused by head movements could be utilized to provide eye-based-motion directions.

It is envisioned by the present invention that other gesture-based devices may also be used. For example, a text input method based on hand gestures for wearable computers where a character is written by a fingertip and then recognized through a character recognition method, such that the writing procedure is controlled by hand gestures including hand tracking, gesture recognition and fingertip positioning. By further example, a gesture keyboard input device for entering phonetic scripts is envisioned in which a pen-based device is used to input text in multiple languages.

In various implementations the present invention may also include generating an input signal having predefined characteristics corresponding to the input device being utilized to engage the system directives.

Text-Based Directives

In a further implementation a text input device providing text-based direction, such as a Microsoft Chatpad device, is utilized to provide text-based directives. To describe the features of such a device refer now to the following description in conjunction with the accompanying FIGS. 3 and 4.

Figure 3:
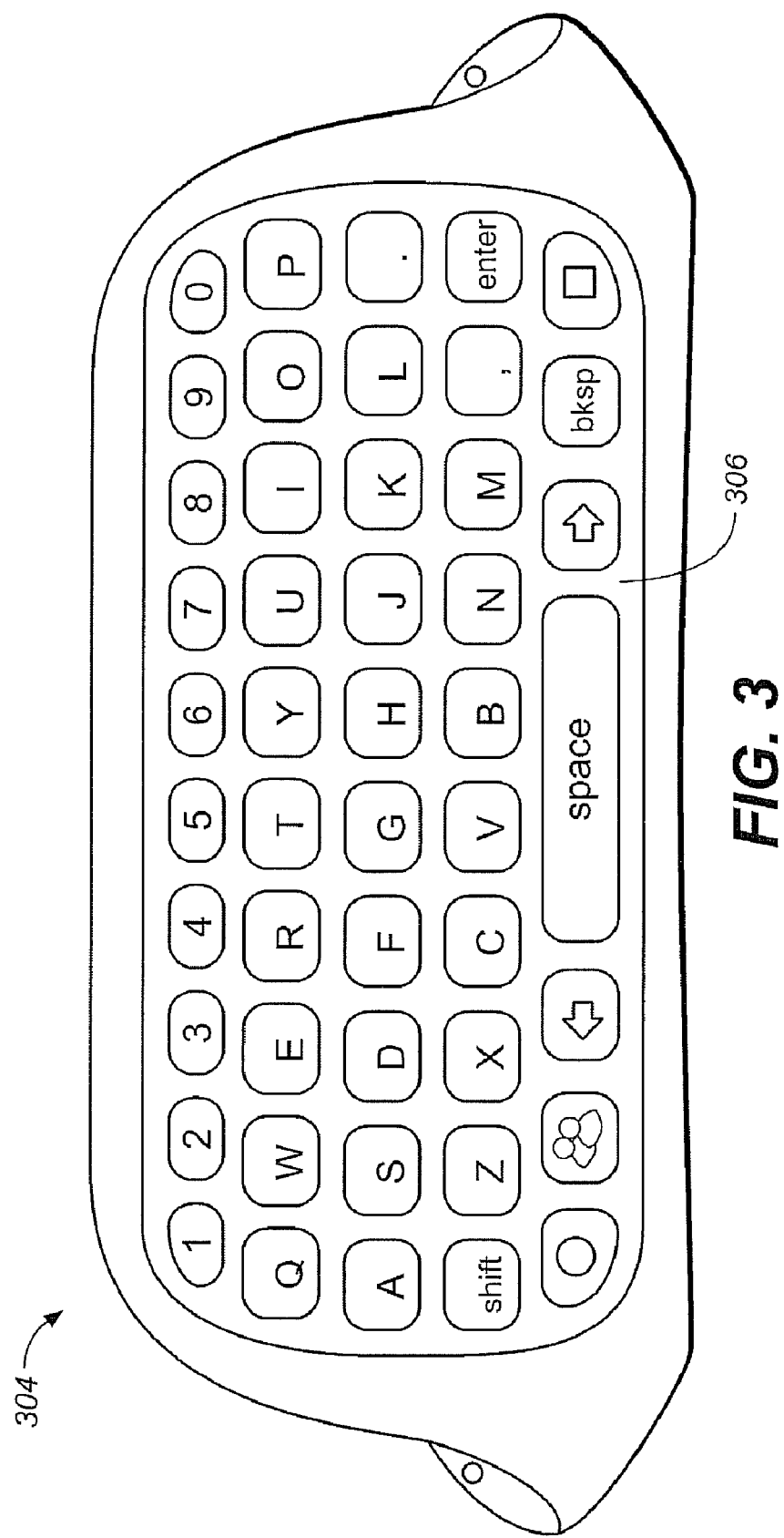
FIG. 3 is an illustration of a Microsoft Chatpad device 304 (which may also be associated using the XBox® 360 gaming console).

FIG. 3 is an illustration of a Microsoft Chatpad device 304 (which may also be associated using the XBox® 360 gaming console). This device 304 allows for text input to video games and chatting through Xbox LIVE and Windows-based PCs. This device 304 allows for connection to a game controller. The device 304 preferably includes a keypad 306. The device 304 can be utilized, for example, to provide a system directive to a game controller (not shown) based on signals generated in response to triggered input actions. For instance, the depression of a key sequence such as "AB" of the keyboard 306 causes a signal to be generated by the input device 304 in relation to the key sequence "AB". As a part of that signal, a system directive in relation to the "AB" key sequence is provided as output from the input device 304. Although the Microsoft Chatpad device is utilized in conjunction with the present invention, one of ordinary skill in the art readily recognizes that a variety of other text input devices could be used and their use is envisioned by the present invention and would be within the spirit and scope of the present invention.

In an embodiment, the game console 102 (FIG. 1) would display a system prompt to the user when a special button combination (i.e., key sequence) is pressed, or other triggering event is activated. Ideally, in one implementation, for example, in the Microsoft Chatpad device 304 a button, or button combination is reserved to display this system prompt. The reserved button or reserved button combination in one embodiment could further be used to disengage any other text entry and initiate a system directive. Finally in a further implementation a user could further initiate a system prompt and system directive by preceding their text entry with a special "system directive character" such as a slash, for example. To describe the operation of the device 304 refer now to the following description in conjunction with FIG. 4.

Figure 4:
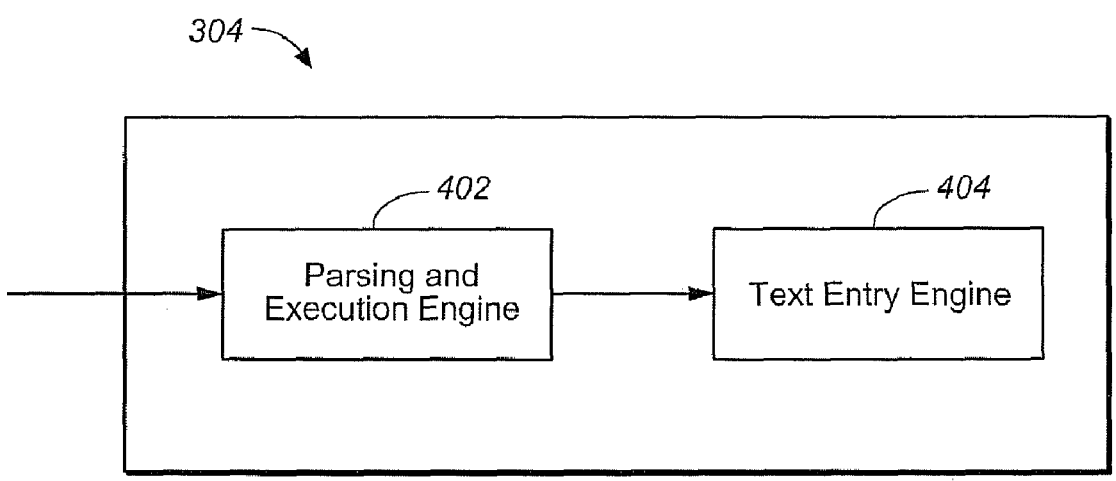
FIG. 4 is a block diagram of a text input device including a parsing and execution engine and a text entry engine.

FIG. 4 is a block diagram of a text input device 304 of FIG. 3 in one implementation including a parsing and execution engine 402 and a text entry engine 404. Typically, the device 304 includes a parsing and execution engine 402 and a text entry engine 404 as illustrated in the simple block diagram of FIG. 4, but not necessarily Once the system directive parsing and execution engine 402 is engaged in relation to one or more predetermined characteristics of the input device, the user would use the text entry engine 404 to perform system function tasks System Functions Accordingly, an input controller could be utilized to provide system directives to the game controller. These system directives are then utilized to perform different tasks such as chatting, booting system functions and controller options and managing peripheral and external devices.

Examples of such tasks that could be performed utilizing either gesture-based or text-based directives, in one or more implementations, are listed below, but are not limited to such:

Add friend n00b123 to friends list using the system directive:
f n00b123
Mute user n00b123 using the system directive:
m n00b123
Chat with user n00b123 using the system directive:
c n00b123
Boot CD using the system directive:
b
Reboot using the system directive:
r
Turn off controller 3 using the system directive:
off 3
Turn on camera using the system directive:
on cam
Next song in media player playlist using the system directive:
mp next
View achievements using the system directive:
a
Compare achievements with user n00b123 using the system directive:
a n00b123

As a further embodiment, an auto-compete function could be leveraged to suggest appropriate parameters for commands such as mute, chat, etc.

CONCLUSION

A system and method in accordance with the present invention applies directly to the mechanism a user would need to execute a system-level command. A key aspect of the present invention includes the use of input-based directives having predefined characteristics corresponding to the input device being utilized to engage the system directives, such as text-based and gesture-based directives, for instance, to perform system functions.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for utilizing a game console and an input device, the method comprising:
    mapping commands to system directives of the game console, each command associated with a particular system function;
    configuring an input signal having predefined characteristics to engage the system directives;
    generating the input signal to engage the system directives;
    responsive to the input signal, engaging the system directives; and
    responsive to an engagement of the system directives, performing system functions utilizing an input controller associated with the input device wherein the system directives perform combinations of booting system functions, controller options, accessing hardware and software, and peripheral and external device management and wherein the performing of system functions is performed using gestures.

2. The method of claim 1, wherein the input signal is generated by utilizing at least one button of the input device to engage the system directives.

3. The method of claim 2, wherein the button comprises one of a button of a text input device or a controller button.

4. The method of claim 2, wherein the input controller is a keypad.

5. The method of claim 2, wherein the input controller is a motion sensing technology remote.

6. The method of claim 2, wherein the utilizing step comprising utilizing a special button combination to provide a system prompt to the game console.

7. The method of claim 1, which further includes engaging and disengaging input of system directives utilizing a system directive character.

8. The method of claim 1, wherein the performing of system functions is performed utilizing a keypad.

9. The method of claim 1, wherein the performing of system functions is performed using one or more of touch, motion, inertia, depression, force, neural impulse, voice, or light.

10. The method of claim 1, wherein the performing of system functions is performed to enter one or more states that are reserved for issuing system directives in relation to a respective performance by one or more of text, gestures, touch, motion, inertia, depression, force, neural impulse, voice, or light.

11. The method of claim 1, wherein a reserved sequence of controls allows the system to enter a state that is used for issuing system directives.

12. The method of claim 1, wherein the system directives can perform any combination of booting system functions and controller options, accessing hardware and software, and peripheral and external device management.

13. A system comprising:
a game console; and
an input device having an input controller in communication with the game console, the input device comprising a parsing and execution engine and a text entry engine, wherein the parsing and execution engine maps commands to system directives of the game console and engages the system directives based on at least one button of the input device and the text entry engine performs system functions after system directives are engaged; and
wherein the system directives perform combinations of booting system functions, controller options, accessing hardware and software, and peripheral and external device management and wherein performing of system functions is performed using gestures.

14. The system of claim 13, wherein the at least one button comprises utilizing a special button combination to provide a system prompt to the game console.

15. The system of claim 13, which includes disengaging the system directives utilizing a system directive character.

16. The system of claim 13, wherein the system functions are performed utilizing a keypad.

17. The system of claim 13, wherein performing of system functions is performed using one or more of touch, motion, inertia, depression, force, neural impulse, voice, or light.

18. The system of claim 13, wherein a reserved sequence of controls allows the system to enter a state that is used for issuing system directives.

* * * * *